3,005,929
CATHODE-RAY TUBE BEAM GATE CIRCUITS
William George Reichert, Jr., Cedar Grove, N.J., assignor, by mesne assignments, to Fairchild Camera and Instrument Corporation, Syosset, N.Y., a corporation of Delaware
Filed Apr. 18, 1958, Ser. No. 729,361
10 Claims. (Cl. 315—30)

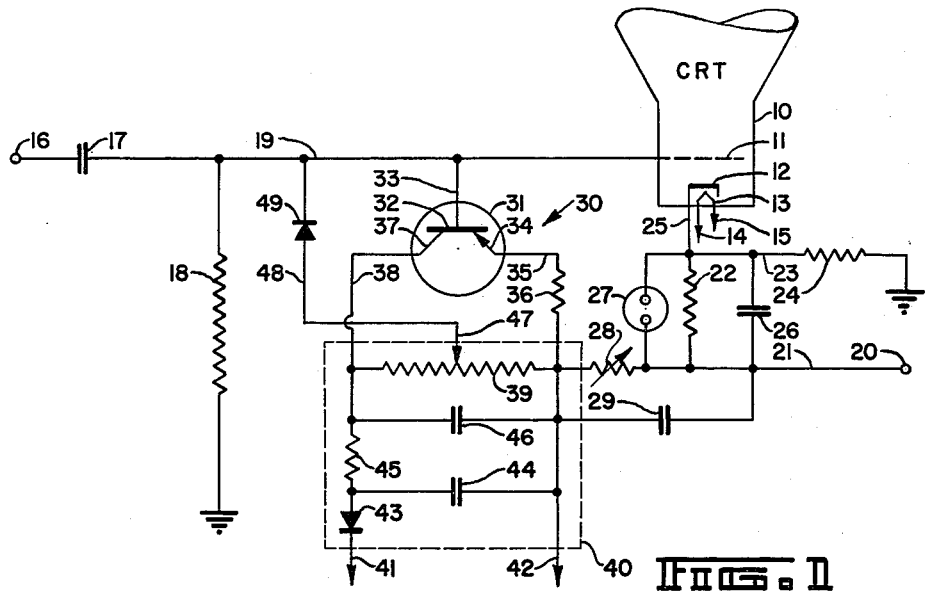
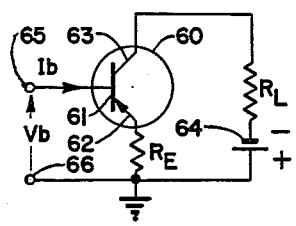
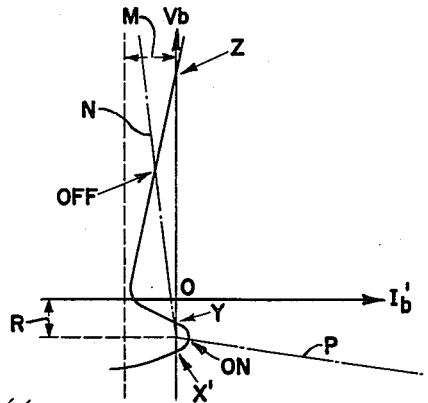
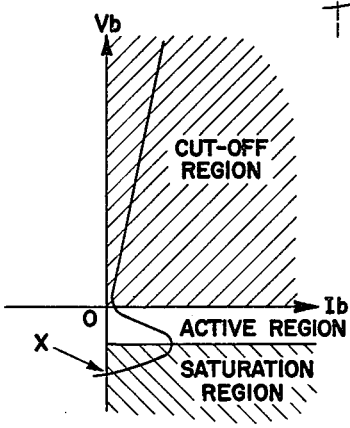

This invention relates to circuits for gating the beam of a cathode-ray tube in response to applied gate pulses.

In the operation of cathode-ray oscilloscopes, it is often undesirable to have the return trace of the electron beam visible since it confuses the presentation of the pattern formed by the beam during the forward trace. This is especially true for oscilloscopes having sawtooth sweep circuits, which are generally used to provide visual presentations of the variations of an applied signal with respect to time. When the period of the return trace, the so-called "fly-back time," is small compared to the period of the forward trace, the visibility of the return trace generally is not a problem. However, if the intensity of the electron beam is increased, to increase the brightness of the pattern formed during the forward trace, the return trace becomes very annoying. In order to avoid seeing the return trace under these conditions, it is customary to gate the electron beam of the cathode-ray tube in response to applied gate pulses. One method of beam gating applies rectangular gate pulses to either the grid or cathode of the tube during the period of the return trace, so that the tube is biased to cut-off during this period. When the gate pulses are applied to the grid of the tube, they are negative pulses and when they are applied to the cathode of the tube, they are positive pulses. Another method of beam gating, often called "intensification," applies rectangular gate pulses to either the grid or cathode of the tube during the forward trace period, so that the beam is intensified during the forward trace and is cut-off during the return trace. If the gate pulses in this method are applied to the grid of the tube, they are positive pulses and if they are applied to the cathode of the tube, they are negative pulses.

In both of the above methods of beam gating, the gate pulses are obtained from a gate generator, the structure of which depends upon the method employed. For example, if beam intensification is utilized and the gate pulses are to be applied to the grid of the tube, positive rectangular voltage pulses are required having a pulse duration equal to the period of the forward trace. These positive gate pulses may be conveniently obtained by differentiating the sawtooth sweep voltage and passing the resulting positive and negative rectangular pulses through a suitable limiter, to eliminate the negative pulses.

Regardless of which method of beam gating is chosen, it is important that the gate pulses from the gate generator be coupled to the appropriate tube element without appreciable waveshape distortion, so that proper gating action is produced. Since the grid and/or cathode elements of the cathode-ray tube are usually at high D.C. potentials relative to the gate generator, it is customary for beam gate circuits to employ a capacitor as part of the coupling between the gate generator and tube element. A capacitor for this use must have a reasonably large value in addition to a high voltage rating, so that it passes the low frequency components of the rectangular gate pulses, thereby avoiding distortion, such as "dishing" of the flat portions of the pulses. However, increasing the value of a capacitor usually decreases its high frequency response, because the stray capacitance of the capacitor increases with an increase in physical size. Any decrease in high frequency response of the coupling capacitor manifests itself as a "rounding" of the corners of the gate pulses and a corresponding reduction in rise time of the pulses. Therefore, it is quite difficult to obtain a coupling capacitor which possesses the required low and high frequency responses in addition to a suitably high voltage rating.

Accordingly, it is an object of this invention to provide a cathode-ray tube beam gate circuit which permits a small coupling capacitor to be used without distorting the waveshape of applied gate pulses.

It is a further object of this invention to provide a cathode-ray tube beam gate circuit which is of small size and light weight, and which requires only a small power supply for operation.

It is a still further object of this invention to provide a cathode-ray tube beam gate circuit which utilizes a bistable transistor trigger circuit to simulate D.C. coupling for the applied gate pulses.

Briefly, the beam gate circuit of the invention comprises a bistable transistor trigger circuit, means for coupling the trigger circuit to one of the elements of a cathode-ray tube, so that the tube is biased to cut-off when the trigger circuit is in one of its stable states of operation and is not biased to cut-off when the trigger circuit is in the other of its stable states of operation, and means for triggering the trigger circuit in response to the leading and trailing edges of applied gate pulses. The trigger circuit is a two-terminal circuit and may comprise a single point contact transistor having base, collector, and emitter elements. The transistor is arranged for two-terminal, base input operation and may be either the "grounded emitter" type or "grounded collector" type, so that both the input and the output of the transistor appears between the base element and one of the remaining elements. In addition, biased unidirectional conducting means may be coupled between the terminals of the transistor trigger circuit, to thereby prevent either of the stable states of operation of the transistor from occurring in the saturation region of operation, which would necessarily limit the frequency response of the trigger circuit.

In the drawing:

FIG. 1 is a circuit diagram of a beam gate circuit constituting a preferred embodiment of the invention;

FIG. 2 is a circuit diagram of a point contact transistor arranged for base input-grounded emitter operation;

FIG. 3 is a diagram showing the base input, voltage-current characteristic of the transistor of FIG. 2; and FIG. 4 is a diagram showing the base input voltage-current characteristic of the transistor trigger circuit in the beam gate circuit of FIG. 1

Referring now to FIG. 1 of the drawing, there is shown a cathode-ray tube 10 having a grid 11, a cathode 12 and a filament 13. Filament 13 is connected by leads 14 and 15 to a suitable filament supply voltage source (not shown). The grid and cathode elements of the cathode-ray tube 10 combine with the usual anode structure (not shown) to form an electron beam, the intensity of which is determined by the potential difference between the grid and cathode, assuming of course, that the anode-cathode voltage is constant. A terminal 16 is adapted to be coupled to a suitable gate generator (not shown) which supplies a series of positive rectangular gate voltage pulses for gating the beam of tube 10 by the "intensification" method. The rectangular gate pulses at terminal 16 are passed through a differentiating circuit composed of capacitor 17 and resistor 18, to a lead 19, which is connected to the grid 11 of the cathode-ray tube. The differentiating circuit differentiates the rectangular gate pulses to obtain positive-going pulses marking the leading edges of the gate pulses and negative-going pulses marking the trailing edges of the gate pulses.

A terminal 20 is adapted to be connected to a source (not shown) of negative D.C. supply voltage for the cathode-ray tube 10. The terminal 20 is also connected to ground through a lead 21, a resistor 22, a lead 23 and a resistor 24, which combine to form a voltage divider circuit. A lead 25 connects the cathode 12 of the tube to the circuit junction of resistors 22 and 24, so that the cathode is maintained at a less negative potential than the potential of terminal 20. Bypass capacitor 26 is arranged to shunt resistor 22 and functions in the usual manner to prevent A.C. signals from altering the D.C. potential of cathode 12. A suitable voltage regulating device 27, which may comprise a simple glow tube, as illustrated, is shunted across resistor 22, so that the potential of the cathode is maintained substantially constant with respect to the potential of terminal 20. Terminal 20 is also connected to a transistor trigger circuit, indicated generally as 30, by lead 21 and a variable resistance 28. The resistance 28 is connected in parallel with a bypass capacitor 29 and functions to control the intensity of the electron beam in tube 10 by varying the grid-cathode voltage.

Trigger circuit 30 is a two-terminal circuit which includes a point contact transistor 31 having a base element 32, which is connected by leads 33 and 19 to the grid of the cathode-ray tube. The emitter element 34 of the transistor is connected by a lead 35 and a resistor 36, to the intensity control resistance 28. The collector element 37 of the transistor is coupled by a lead 38 and a resistor 39 to the same point. Resistor 39 forms part of a D.C. supply voltage source 40, which supplies power to the transistor 31. As illustrated, the source 40 is coupled to an A.C. supply source (not shown) by leads 41 and 42. A rectifier 43 functions to convert the A.C. current from the A.C. supply source into pulsating D.C. current, which is then smoothed by a filter consisting of capacitor 44, resistor 45 and capacitor 46. The output voltage which appears across resistor 39 is then substantially pure D.C. voltage. A tap 47 on resistor 39 is connected to a rectifier 49 by lead 48, so that the rectifier is biased an amount dependent upon the position of the tap along the resistor. Rectifier 49 is also connected to the base of transistor 31 by lead 19.

The operation of the beam gate circuit of FIG. 1 may best be explained by reference to FIG. 2, which shows a conventional point contact transistor 60 arranged for base input-grounded emitter operation. Transistor 60 has a base element 61, an emitter element 62, and a collector element 63. The collector 63 is connected to ground through a load resistor $R_L$ and a D.C. supply source 64. The emitter 62 of the transistor is connected to ground through the usual external emitter resistance $R_E$, which functions to stabilize the operation of the transistor by "swamping out" the effect of the internal emitter-resistance. Since transistor 60 is arranged for base input-grounded emitter operation, the input terminals 65 and 66 are respectively connected to the base element of the transistor and to ground. The positive values of the base-ground voltage $V_b$ and the base current $I_b$ are shown in the direction of the arrows in the figure.

The base input, voltage-current characteristic of the transistor of FIG. 2 is shown in FIG. 3 of the drawing, where the direction of the arrows representing the base voltage $V_b$ and base current $I_b$ represent positive values of these quantities. As seen in FIG. 3, the voltage-current characteristic of the transistor may be divided into three regions of operation, namely, the cut-off region, the active region, and the saturation region. The characteristic curve, itself exhibits a negative slope in the active region of operation, thereby indicating instability. Since the characteristic curve intersects the voltage axis at only one point, designated X, the transistor of FIG. 2 has only one stable operating point. Therefore, if a series of positive-going trigger pulses were applied to the base of the transistor, the transistor would produce only monostable operation, which would not be completely satisfactory for beam gating purposes. Furthermore, the single stable operating point X lies in the saturation region of operation, which necessarily limits the frequency response of the transistor, due to the well known "hole-storage" effects.

When the transistor of FIG. 2 is employed in the beam gate circuit of FIG. 1 however, the base voltage-current characteristic of the transistor assumes the form shown in FIG. 4 of the drawing. As seen in FIG. 4, resistor 18 functions as a "bleeder" resistance to draw current out of the base of the transistor, thereby shifting the voltage-current characteristic curve along the current axis, by an amount M. The input current $I_b'$ of the transistor therefore is the sum of the bleeder current M and the base current $I_b$. Since the characteristic curve now intersects the voltage axis at points X', Y and Z, it is apparent that three operating points are produced. Only points X' and Z are stable however, since, point Y occurs in the negative slope portion of the characteristic curve. Accordingly, the point contact transistor 31 is bistable and may be employed as a trigger circuit.

While the transistor thus far described, can satisfactorily provide bistable trigger operation, it may be noted that the lower stable operation point X' occurs in the saturation region of transistor operation. This, of course, limits the frequency response of the transistor trigger circuit because of the aforementioned "hole-storage" effects. In order to avoid this, the rectifier 49 is arranged, as a load, to shunt the terminals of the transistor trigger circuit, so that a load line, identified as N and P in FIG. 4, intersects the characteristic curve of the transistor at the two stable "off"-"on" operating points. Since the diode 49 is biased by the potential at tap 47, the load line P, representing the forward biased condition of the diode, is shifted an amount R from the current axis, so that the lower, or "on," operating point is removed from the saturation region of the operation. The transistor trigger circuit now exhibits two stable states of operation and has a suitable frequency response characteristic.

Assuming initially that the trigger circuit in FIG. 1 of the drawing is in its "on" state of operation, it may be seen that the potential at the base of the transistor, and hence the potential at the grid of tube 10, is more negative than the potential at the circuit junction of resistors 28 and 36. Since the voltage drop across resistor 22 is substantially constant, it acts as a source of bias voltage to make the potential at the junction of resistors 28 and 36 more negative than the potential of the tube cathode, so that the tube is biased to cut-off. If a positive gate pulse is now applied to terminal 16, the resistance-capacitance differentiating circuit will provide a positive-going trigger pulse marking the leading edge of the gate pulse. This positive trigger pulse triggers the transistor trigger circuit into its "off" state of operation and causes the grid of the cathode-ray tube to become more positive than the junction of resistors 28 and 36, with the result that the tube is no longer biased to cut-off. The trigger circuit remains in the stable "off" state until the differentiating circuit provides a negative-going trigger pulse marking the trailing edge of the gate pulse. This pulse triggers the transistor back into its "on" state of operation and again biases the cathode-ray tube to cut-off. Each succeeding gate pulse produces the same operating sequence, with the result that effective gating action is provided for the beam of the tube.

From the foregoing description of the operation of the beam gate circuit of the invention, it may be seen that coupling capacitor 17 need not have the usually required low frequency response, since the bistable action of the transistor trigger circuit insures that the flat portion of the gate pulses will not be distorted. Furthermore, the two-terminal trigger circuit of the invention has an inherently low shunt capacitance, so that good high frequency response is obtained and the rise time of the gate pulses is not deteriorated. Accordingly, it is possible to use a low value coupling capacitor which has the required high voltage rating without affecting the gating action. Since the transistor trigger circuit is a two-terminal circuit, the leading edges of the gate pulses are effectively coupled to both the transistor base element and the grid of the cathode-ray tube. This permits the large initial current needed to charge the stray capacitance between the tube grid and ground, to be supplied by the gate generator rather than the trigger circuit power supply, as would be the case if three or four terminal circuit were employed. Therefore, the power supply required for the transistor trigger circuit is so low, it may even be obtained from the usual filament supply voltage source for the cathode-ray tube. Finally, in the beam gate circuit of the invention, a single transistor is made to exhibit a bistable characteristic, which normally requires the use of two or more vacuum tubes in similar bistable tube circuits.

It is believed apparent that many changes can be made in the above beam gate circuit and many seemingly different embodiments of the invention can be constructed without departing from the scope thereof. For example, while a base input-grounded emitter transistor circuit is utilized in the illustrated embodiment of the invention, it is obviously possible to employ a base input-grounded collector circuit and still obtain the required bistable action. Similarly, the beam gate circuit of the invention could be employed in methods of beam gating other than the "intensification" method of the illustrated embodiment of the invention. Accordingly, it is intended that the matter contained in the above description, or shown in the accompanying drawing, shall be interpreted as illustrative and not in a limiting sense.

What is claimed is:

1. A beam gate circuit for a cathode ray tube having at least grid and cathode electrodes, said circuit comprising a two-terminal bistable point contact transistor trigger circuit having base, collector and emitter elements; means coupling said trigger circuit to one of said electrodes, so that the tube is biased to cutoff when said trigger circuit is in one of its stable states of operation and is not biased to cutoff when said trigger circuit is in the other of its stable states of operation, including means for coupling the base element of said transistor to one terminal of the trigger circuit and means for coupling the emitter element of said transistor to the other terminal of the trigger circuit; means for triggering said trigger circuit in response to the leading and trailing edges of applied gate pulses; unidirectional conducting means coupled between the terminals of the trigger circuit; and means for biasing said unidirectional conducting means, so that neither of the stable states of operation of the transistor occurs in the saturation region of operation.

2. A beam gate circuit as claimed in claim 1, wherein said means for triggering said trigger circuit comprises a resistance-capacitance differentiating circuit.

3. A beam gate circuit for a cathode ray tube having at least grid and cathode electrodes, said circuit comprising a two-terminal bistable point contact transistor trigger circuit having base, collector and emitter elements; a source of substantially constant bias voltage; means for coupling said trigger circuit and said source of bias voltage in circuit between said electrodes with one terminal of said trigger circuit coupled to one of said electrodes, so that the tube is biased to cutoff when said trigger circuit is in one of its stable states of operation and is not biased to cutoff when said trigger circuit is in the other of its stable states of operation, including means for coupling the base element of said transistor to the terminal of the trigger circuit coupled to said one tube electrode and means for coupling one of the remaining elements of said transistor to the other terminal of the trigger circuit; means for triggering said trigger circuit in response to the leading and trailing edges of applied gate pulses, unidirectional conducting means; and means for coupling said unidirectional conducting means between the terminals of the trigger circuit, said last-named means including means for biasing the unidirectional conducting means so that neither of the stable states of operation of the transistor occurs in the saturation region of operation.

4. A beam gate circuit as claimed in claim 3 wherein said means for triggering the trigger circuit comprises a resistance-capacitance differentiating circuit coupled to the base element of said transistor.

5. A beam gate circuit as claimed in claim 4, wherein said one remaining element of the transistor coupled to the other terminal of the trigger circuit is the emitter element.

6. A beam gate circuit for a cathode ray tube having at least grid and cathode elements, said circuit comprising a point contact transistor having base, collector and emitter elements; means for coupling the base element of said transistor to the grid element of the tube; means adapted to couple a source of D.C. supply voltage for the transistor between the remaining elements of the transistor; a source of substantially constant D.C. bias voltage; means for coupling said source of bias voltage between the cathode element of the tube and one of the remaining elements of said transistor, so that said transistor has two stable states of operation and the tube is biased to cutoff when said transistor is in one of its stable states of operation and is not biased to cutoff when said transistor is in the other of its stable states of operation; a resistance capacitance differentiating circuit having an input and an output, the input of said differentiating circuit being adapted to be coupled to a source of gate pulses for the tube; and means for coupling the output of said differentiating circuit to the base element of said transistor, so that said transistor is adapted to be triggered into one of its stable states of operation in response to the leading edges of the gate pulses and is adapted to be triggered into the other of its stable states of operation in response to the trailing edges of the gate pulses; a rectifier, and means for coupling said rectifier between the base element of said transistor and said one remaining element of the transistor coupled to said source of bias voltage, said last named means including means for biasing said rectifier, so that neither of the stable states of operation of the transistor occurs in the saturation region of operation.

7. A beam gate circuit as claimed in claim 6 wherein said one remaining element of the transistor coupled to said source of bias voltage is the emitter element.

8. A beam gate circuit for a cathode ray tube, said tube having at least grid and cathode elements; said circuit comprising a transistor trigger circuit having a first base input electrode and second and third electrodes; means applying an input triggering signal to said base electrode; means directly connecting said base to said grid element; means for coupling said second and third electrodes to said cathode, whereby both input and output of said transistor appears between said base and one of said second or third electrodes; reference means; and direct voltage bias means comprising a voltage divider connected between said second and third electrodes and said reference means to cause said trigger circuit coupled to said grid and cathode elements to operate at a particular potential level established at said elements with respect to said reference.

9. The device of claim 8 wherein said transistor circuit is bistable and said input trigger signal means comprises a differentiating circuit to cause said bistable transistor to generate rectangular output pulses applied to said grid.

10. The device of claim 9 wherein said bistable circuit comprises a single transistor having a negative resistance characteristic.

References Cited in the file of this patent

UNITED STATES PATENTS 2,465,364    Ferrar    Mar. 29, 1949

(Other references on following page)

UNITED STATES PATENTS

| | | |
|---|---|---|
| 2,629,833 | Trent | Feb. 24, 1953 |
| 2,776,375 | Keiper | Jan. 1, 1957 |
| 2,795,717 | Finkelstein et al. | June 11, 1957 |
| 2,810,080 | Trousdale | Oct. 15, 1957 |
| 2,820,145 | Wolfendale | Jan. 14, 1958 |
| 2,831,983 | Ostendorf | Apr. 22, 1958 |
| 2,852,751 | Lundry | Sept. 16, 1958 |
| 2,863,069 | Campanella | Dec. 2, 1958 |

OTHER REFERENCES

Herzog et al.: Transistorized Portable Receiver, Radio-Electronics, January 1955.